United States Patent
Xue et al.

(10) Patent No.: US 8,649,585 B2
(45) Date of Patent: Feb. 11, 2014

(54) METHOD AND SYSTEM FOR RETROSPECTIVE IMAGE COMBINATION UNDER MINIMAL TOTAL DEFORMATION CONSTRAIN FOR FREE-BREATHING CARDIAC MAGNETIC RESONANCE IMAGING WITH MOTION CORRECTION

(75) Inventors: Hui Xue, Franklin Park, NJ (US); Saurabh Shah, Evanston, IL (US); Christoph Guetter, Lawrenceville, NJ (US); Marie-Pierre Jolly, Hillsborough, NJ (US); Sven Zuehlsdorff, Westmont, IL (US); Jens Guehring, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 112 days.

(21) Appl. No.: 13/295,416

(22) Filed: Nov. 14, 2011

(65) Prior Publication Data
US 2012/0121153 A1    May 17, 2012

Related U.S. Application Data

(60) Provisional application No. 61/413,607, filed on Nov. 15, 2010.

(51) Int. Cl.
*G06K 9/00* (2006.01)

(52) U.S. Cl.
USPC .......................................... 382/131; 382/128

(58) Field of Classification Search
None
See application file for complete search history.

(56) References Cited

U.S. PATENT DOCUMENTS

| 7,454,241 B2 | 11/2008 | Beck |
| 7,689,263 B1 * | 3/2010 | Fung et al. ..................... 600/410 |
| 2008/0205730 A1 | 8/2008 | Stehning et al. |
| 2011/0208039 A1 | 8/2011 | Guehring et al. |

OTHER PUBLICATIONS

Ledesma-Carbayo MJ, Kellman P, Arai AE, McVeigh ER. Motion corrected free-breathing delayed-enhancement imaging of myocardial infarction using nonrigid registration. Journal of Magnetic Resonance Imaging. 2007;26(1)184-190.*

Hui Xue et al., "Unsupervised Inline analysis of Cardiac Perfusion MRI", MICCAI, 741-749, 2009.

\* cited by examiner

*Primary Examiner* — Nirav G Patel

(57) ABSTRACT

A method and system for retrospective image combination for free-breathing magnetic resonance (MR) images is disclose. A free-breathing cardiac MR image acquisition including a plurality of frames is received. A key frame is selected of the plurality of frames. A deformation field for each frame to register each frame with the key frame. A weight is determined for each pixel in each frame based on the deformation field for each frame under a minimum total deformation constraint. A combination image is then generated as a weighted average of the frames using the weight determined for each pixel in each frame.

27 Claims, 3 Drawing Sheets

METHOD AND SYSTEM FOR RETROSPECTIVE IMAGE COMBINATION UNDER MINIMAL TOTAL DEFORMATION CONSTRAIN FOR FREE-BREATHING CARDIAC MAGNETIC RESONANCE IMAGING WITH MOTION CORRECTION

This application claims the benefit of U.S. Provisional Application No. 61/413,607, filed Nov. 15, 2010, the disclosure of which is herein incorporated by reference.

BACKGROUND OF THE INVENTION

The present invention relates to free-breathing cardiac magnetic resonance imaging, and more particularly, to image combination to perform retrospective noise suppression for free-breathing cardiac magnetic resonance imaging.

Cardiac magnetic resonance (MR) is an important non-invasive modality for studying heart functions. However, the majority of cardiac studies rely on breath-held, segmented data acquisition, mainly due to the rapid and periodic beating of the human heart and limitations of imaging efficiency of conventional MR systems. Unfortunately, breath holding is often particularly difficult for patients with congestive heart disease of for uncooperative pediatric subjects. Accordingly, real-time cardiac imaging is of clinical interest. However, real-time imaging techniques, when compared to breath-held acquisitions, often compromise spatial/temporal resolution or sacrifice signal to noise ratio (SNR) to fit into a tight acquisition window, despite the broad use of parallel imaging and rapid imaging sequences.

BRIEF SUMMARY OF THE INVENTION

The present invention provides a method and system for retrospective image combination to improve signal to noise ratio (SNR) for free-breathing cardiac magnetic resonance imaging (MRI) with motion correction. Embodiments of the present invention calculate weights for every pixel in a set of images after motion correction. In embodiments of the present invention, the quality of the motion correction influences the output pixel values by minimizing the total amount of non-rigid deformation brought into the image combination. The optimal weights calculation can be formulated as an energy minimization problem and solve efficiently under a variational framework.

In one embodiment of the present invention, an MR image acquisition comprising a plurality of frames is received. A key frame of the plurality of frames is selected. A deformation field is generated for each of the plurality of frames to register each of the plurality of frames with the key frame. A weight is determined for each pixel in each of the plurality of frames based on the deformation field for each frame. A combination image is then generated as a weighted average of the plurality of frames using the weight determined for each pixel in each frame.

These and other advantages of the invention will be apparent to those of ordinary skill in the art by reference to the following detailed description and the accompanying drawings.

DETAILED DESCRIPTION

Figure 1:
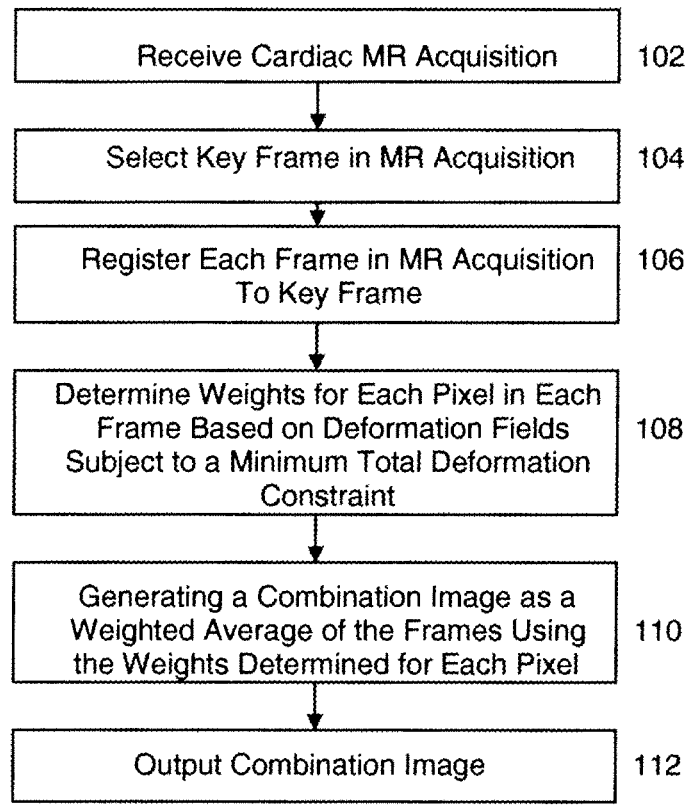
FIG. 1 illustrates a method for retrospective image combination for free-breathing MR images with motion correction.

The present invention is directed to a method and system for retrospective image combination for free-breathing cardiac magnetic resonance imaging (MRI). Embodiments of the present invention are described herein to give a visual understanding of the image combination method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Recent developments in cardiac magnetic resonance (MR) have shown that improved signal to noise ratio (SNR) can be achieved by selectively averaging free breathing MR images that have been motion corrected using non-rigid image registration. Substantial SNR improvements have been reported for spatial-temporal cardiac cine images, high SNR free-breathing delay enhancement MR imaging, and free-breathing single-shot fat-water separated cardiac MR imaging. All such studies rely on retrospectively applying image registration to correct the heart motion across multiple heart beats. The corrected images are then combined via uniform averaging to achieve noise suppression. In order to attempt to avoid the appearance of visible artifacts introduced by imperfect non-rigid motion correction on the images, previous techniques apply heuristic criteria to exclude some frames from the final averaging.

Non-rigid image registration, which is implemented as essentially an optimization process to find local optima, can lead to variant correction accuracy for different frames and for different regions within a frame. Uniformly averaging multiple motion-corrected frames will likely lead to sub-optimal outputs, as all pixels in the corrected frames are weighted equally without considering the quality of the registration for individual pixels. Furthermore, the exclusion of frames from the image combination lowers the possible SNR gains which can be achieved by including a greater number of frames in the image combination.

Embodiments of the present invention provide a method that calculates optimal weights for every pixel after the motion correction. In this method, the quality of the motion correction influences the pixel values of the output combined image by minimizing the total amount of non-rigid deformation brought into the image combination. The optimal weights calculation is formulated as an energy minimization problem and solved efficiently under a variational framework.

Embodiments of the present invention provide a solution to estimate the optimal weights for retrospective image combination of motion-corrected free-breathing cardiac MR image.

As compared to simple averaging with heuristic frame exclusion, embodiments of the present invention can lead to further improved noise suppression and less artifacts caused by non-rigid image registration appearing in the combined image. The solution presented herein is based on a theoretically sound variational framework. Embodiments of the present invention are fully automated and no manual interaction is required, which is well-suited for the scenario of retrospective SNR enhancement in motion-corrected free-breathing cardiac imaging. The potentially applicability of the method described herein includes, but is not limited to, many free-breathing cardiac MR imaging applications, such as real-time cine, fat-water separation imaging, and delay-enhancement imaging.

FIG. 1 illustrates a method for retrospective image combination for free-breathing MR images with motion correction. The method of FIG. 1 performs retrospective image combination to suppress noise in free-breathing MR images with motion-correction. As illustrated in FIG. 1, at step 102, a free-breathing cardiac MR acquisition including a plurality of frames. The cardiac MR acquisition is a set of MR images, where each image in the set of MR images is referred to as a frame. The cardiac MR acquisition can be a temporal sequence of MR images. According to various embodiments of the present invention, the cardiac CT acquisition can be any type of free-breathing cardiac MR images, such as real-time cardiac cine MR images, cardiac fat-water MR images, or delayed enhancement MR images. The set of MR images may be received directly from an image acquisition device, such as an MR scanner. Alternatively, the set of MR images may be received by loading a set of MR images that have been previously acquired and stored, for example in a memory or storage of a computer system.

At step 104, a key frame is selected from the frames of the cardiac MR acquisition. The key frame (or reference frame) is a frame that is used to register the other images. In one embodiment, the key frame is selected by searching for the frame with the minimal mean squared error (MSE) to all other frames in the cardiac MR acquisition. In particular, each frame is compared to every other frame on a pixel by pixel basis. For a comparison of a first frame to a second frame, the pixel value of each pixel in the first frame is compared to a corresponding pixel in the second frame, resulting in an error value for each pixel. The error value for each pixel is squared and the mean of the squared error values in determined resulting in an MSE value between the first frame and the second frame. The frame with the lowest total MSE value between that frame and all the other frames is selected as the key frame.

At step 106, each of the frames in the cardiac MR acquisition is registered to the key frame. The registration is performed in order to correct cardiac motion between the frames. Each frame is registered to the key frame using a non-rigid image registration. In an advantageous implementation, the registration can be performed using a non-rigid motion correction algorithm that is based on solving a partial differential equation and maximizing the localized cross-correlation. This registration method is described in greater detail in Hui Xue et al., "Unsupervised Inline Analysis of Cardiac Perfusion MRI", *MICCAI*, 741-749, 2009, which is incorporated herein by reference. The image registration results in deformation fields calculated for each frame. The deformation field for a frame is a map of the deformation of each pixel in that frame resulting from the registration with the key frame. Accordingly, the registration determines a deformation for each pixel of each frame. It can be noted that the deformation of the pixels in the key frame is zero.

At step 108, weights are determined for each pixel in each frame based on the deformation fields resulting from the image registration in order to combine the frames under a minimum total deformation (MTD) constraint. It can be assumed that the non-rigid registration is not uniform across different frames and across different regions in one frame. The deformation fields, as the outputs of the non-rigid registration process, provide information regarding the accuracy of the motion correction at each pixel. The deformations to correct cardiac motion should typically be small, so it can be assumed that a large deformation is more related to visible smearing artifacts introduced by the motion correction. Accordingly, given a group of N frames I(x, y, t), t=0, 1, 2, ..., N of a free-breathing cardiac MR acquisition, the optimal weight is defined as a function w(x, y, t), t=0, 1, 2, ..., N to minimize the following energy functional:

$$w(x, y, t) = \min_w f(w, \overrightarrow{deform})$$

where the functional $f(w, \overrightarrow{deform})$ is defined as:

$$f(w, \overrightarrow{deform}) \stackrel{def}{=} f(w(x, y, t), \overrightarrow{deform(x, y, t)}) = \int\int\int_\Omega \left[ w^2(x, y, t) \cdot |\overrightarrow{deform(x, y, t)}| + \mu \cdot |\nabla w(x, y, t)|^2 + \beta \cdot \left(w(x, y, t) - \frac{1}{N}\right)^2 \right] dx\, dy\, dt \quad \text{(Equation 1)}$$

where, $\overrightarrow{deform(x,y,t)}$ is the deformation field. In the 2D case, the deformation field is a vector field $(d_x(x, y, t), d_y(x, y, t))$ representing the deformation of a pixel in the x and y directions.

In the Equation 1, the first term penalizes a large deformation, which minimizes the total amount of deformation brought into the image combination. The second term is the regularizer:

$$\forall x(x, y, t) = (w_x(x, y, t), w_y(x, y, t), w_t(x, y, t))$$

The regularizer term enforces smoothness on changes of the weights. The third term keeps the weighting relatively close to uniform averaging, as this strategy is statistically optimal for identically distributed (IID) random additive noise. That is the third term penalizes sets of weights the more the weights vary from uniform averaging. $\mu$ and $\beta$ are fixed value parameters that are used to weight the second and third terms, respectively, in Equation (1). These values can be preset base don experimental data.

Following the calculus of variation, Equation (1) can be minimized by solving the following Euler equation:

$$\mu \cdot \nabla^2 w(x, y, t) - \left(|\overrightarrow{deform(x, y, t)}| + \beta\right) \cdot w(x, y, t) + \frac{\beta}{N} = 0. \quad \text{(Equation 2)}$$

Here, $\nabla^2 w(x, y, t)$ is the Laplace operator which is the natural derivation of regularization term of Equations (1).

Equation (2) can be solved by treating the set of pixel weights w(x, y, t) as functions of an evolution parameter k and solving:

$$\frac{\partial w}{\partial k} = \mu \cdot \nabla^2 w_k(x, y, t) - \left(\overrightarrow{|\text{deform}(x, y, t)|} + \beta\right) \cdot w_k(x, y, t) + \frac{\beta}{N} \quad \text{(Equation 3)}$$

The steady-state solution of Equation (3) is the desired solution of the Euler equation. The resulting weights will minimize the energy function defined in Equation 1. Note the Equation 3 belongs to the generalized diffusion equation. The convergence of this kind of equation is theoretically guaranteed if the iteration step $\Delta k$ is sufficient small. To stably solve the Equation 3, the second order derivatives are estimated under the scale-space concepts by convolving the weight function $w_k$ (x, y, t) with the second-order derivative of a Gaussian kernel.

As described above, the estimation of weights for the pixels in each of the frames is formulated as an energy minimization problem under a minimum total deformation constrain, as set forth in Equation (1), a variational solution to the energy minimization problem is set forth in Equation (2) and solved by calculating the steady-state solution of Equation (3). This results in the set of weights that specifies a separate weight for each pixel in each image based on the deformation determined for each pixel in the image registration step.

At step 110, a combination image is generated as a weighted average of the frames using the weights determined for each pixel of each frame. In particular, the pixel value of each pixel of the combination image is determined by calculating a weighted average of the pixel values of corresponding pixels in all of the frames, where each pixel in each frame is weighted using the weights determined in step 108.

At step 112, the combination image is output. For example, the combination image can be output on a display device of a computer system. The combination image can also be stored for example, in a memory or storage of a computer system. The combination image can also be output for use in a further image processing algorithm.

In one embodiment, the method of FIG. 1 can be applied to free-breathing fat-water separation MR imaging. In one experiment, the present inventors have tested the method of FIG. 1 on a free-breathing, single shot fat-water separated imaging protocol using parallel imaging acceleration. Motion corrected averaging of multiple free-breathing repetitions was employed to suppress image noise. A total of 7 volunteers were scanned using the fat-water imaging sequences. Each scan includes 8 repetitions for two echoes, which led to 8 water and 8 fat images after fat-water separation. For each set of images (i.e., water and fat), a key/reference frame is first selected by searching for the minimal MSE error to all other frames on the water+fat images. The motion correction is then applied to both the water and fat images. Every frame except the key frame is registered to the key frame and the resulting deformation fields serve as inputs to estimate the optimal weighting functions subject to a minimum total deformation (MTD) constraint, as described above in step 108 of FIG. 1. The non-rigid motion correction algorithm is based on solving a partial differentiate equation and maximizing the localized cross-correlation.

Figure 2:
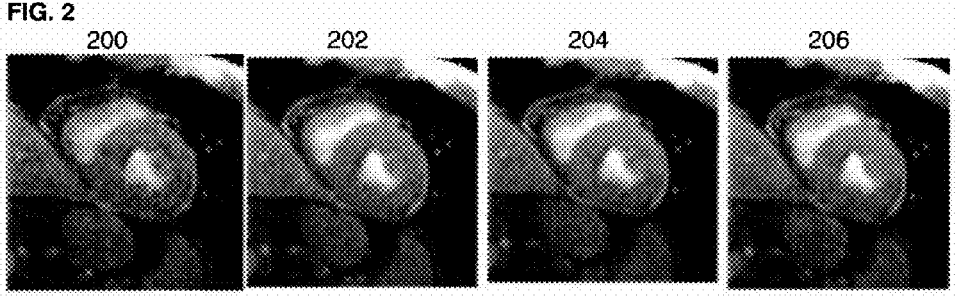
FIG. 2 illustrates exemplary combination results for the fat-water separation MR images using the MTD combination as compared with conventional image combination techniques.

FIG. 2 illustrates exemplary combination results for the fat-water separation MR images using the MTD combination as compared with conventional image combination techniques. As illustrated in FIG. 2, image 200 shows a single shot water image, image 202 shows a 50% combination water image, image 204 shows a 100% combination water image, and image 206 shows the MTD combination water image generated using the method of FIG. 1. The 50% combination image is an image resulting from half of the total frames being selected and uniformly averaged and the 100% combination image is an image resulting from all of the frames being uniformly averaged. FIG. 2 shows the superior performance of MTD combination 206. First, if compared to the result of 50% combination 202, the MTD output 206 shows better noise suppression. Second, although the 100% combination image 204 shows the similar SNR to the MTD combination image 206, the MTD combination image 206 leads to less smearing artifacts introduced by motion correction.

Figure 3:
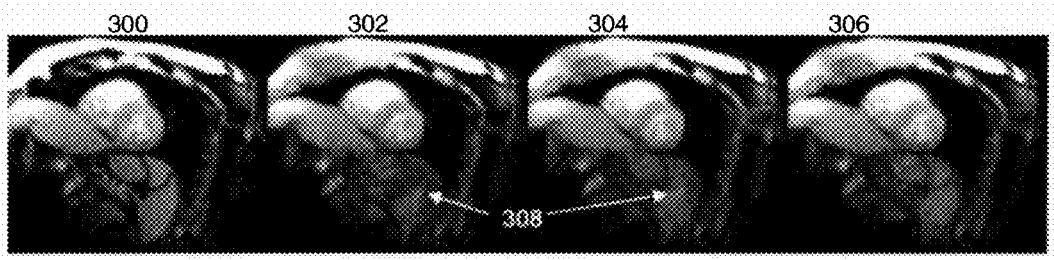
FIG. 3 illustrates smearing artifacts introduced by imperfect motion correction.

FIG. 3 illustrates smearing artifacts introduced by imperfect motion correction. As illustrated in FIG. 3, image 300 shows a single shot water image, image 302 shows a 50% combination water image, image 304 shows a 100% combination water image, and image 306 shows the MTD combination water image generated using the method of FIG. 1. In regions of the image in which the performance of the fully automated motion correction is less effective, the smearing artifacts 308 can even show up in the 50% combination image, while the MID weighting method described above more effectively suppresses these imperfections. For example, as shown in FIG. 3, smearing artifacts 308 appear in the 50% combination image 302 and the 100% combination image 304, but these artifacts are effectively suppressed in the MTD combination image 306.

To quantify the effects of noise suppression, a retrospective noise variance estimation algorithm (MPLaw) based on Karhunen-Loeve transform and Marcenko-Pastur distribution is applied to the selected key frame (single-shot), the 50% combination image, the 100% combination image, and the MTD combined image. For comparison purposes, all noise variances are normalized against the corresponding key frames which are the noisiest. Table 1 summarizes the estimated noise variances. As shown in Table 1, the noise suppression of MTD combination is comparable to 100% averaging and better than 50% combination, and its gain is further supported by less visible motion-correction artifacts.

TABLE 1

Estimated normalized noise variances for fat-water separation imaging

|  | Single-shot | 50% combination | 100% combination | MTD combination |
|---|---|---|---|---|
| water | 1.0 | 0.206 ± 0.081 | 0.159 ± 0.058 | 0.180 ± 0.066 |
| fat | 1.0 | 0.334 ± 0.135 | 0.221 ± 0.073 | 0.232 ± 0.044 |

Figure 4:
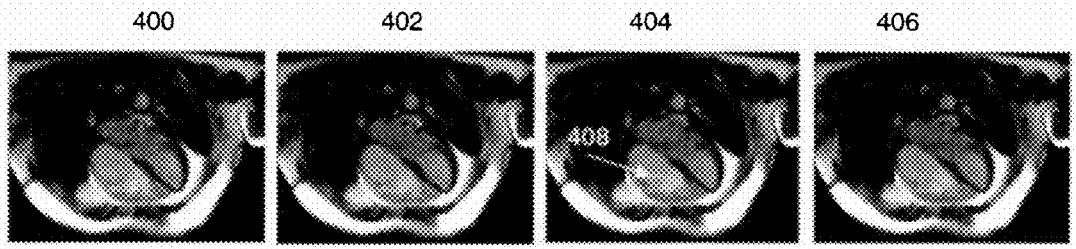
FIG. 4 illustrates exemplary combination results for the real-time cine images using the MTD combination as compared with conventional image combination techniques.

In another embodiment, the method of FIG. 1 can be applied to free-breathing real-time cardiac MR imaging in order to improve the SNR ratio of real-time cine cardiac imaging. In one experiment, a total of 6 real-time cine series were acquired on 1.5T Siemens Avanto scanner using a True-FISP sequence. Each series has 256 frames. To apply the motion correction based image combination, every 16 consecutive frames are registered together and one average image is generated. FIG. 4 illustrates exemplary combination results for the real-time cine images using the MTD combination as compared with conventional image combination techniques. As illustrated in FIG. 4, image 400 shows a single frame of a free-breathing real-time cine image, image 402 shows a 50% combination image for a sixteen-frame group, image 404 shows a 100% combination image for a sixteen-frame group, and image 406 shows the MTD combination image for a sixteen-frame group generated using the method of FIG. 1. As compared to the 50% combination result 402, the MTD combination 406 achieves higher SNR and the MTD combination image 406 is less prone to registration artifacts 408, which can be seen in the 100% combination image 404. The MPLaw method is applied to quantify the noise variances of the single frame of the free-breathing cine, the 50% combination, the 100% combination, and the MTD combination, which are summarized in Table 2.

TABLE 2

Estimated normalized noise variances for free-breathing real-time cine images

| | Free-breathing | 50% combination | 100% combination | MTD combination |
|---|---|---|---|---|
| Noise variance | 1.0 | $0.687 \pm 0.200$ | $0.622 \pm 0.165$ | $0.612 \pm 0.189$ |

As described above, embodiments of the present invention provide a novel image combination method to perform retrospective noise suppression for the free-breathing cardiac MR imaging via the estimation of optimal weights with a minimal total deformation (MTD) constraint. This method can achieve greater noise suppression, as well as provide better tolerance to artifacts introduced by imperfect motion correction, than conventional techniques. This method is fully automated and computationally efficient. At least in part due to its variational formulations for estimating weights. Applicability of the above described method has been demonstrated on fat-water separation, real-time cine, and free-breathing delayed enhancement imaging, but the present invention is not limited thereto.

Figure 5:
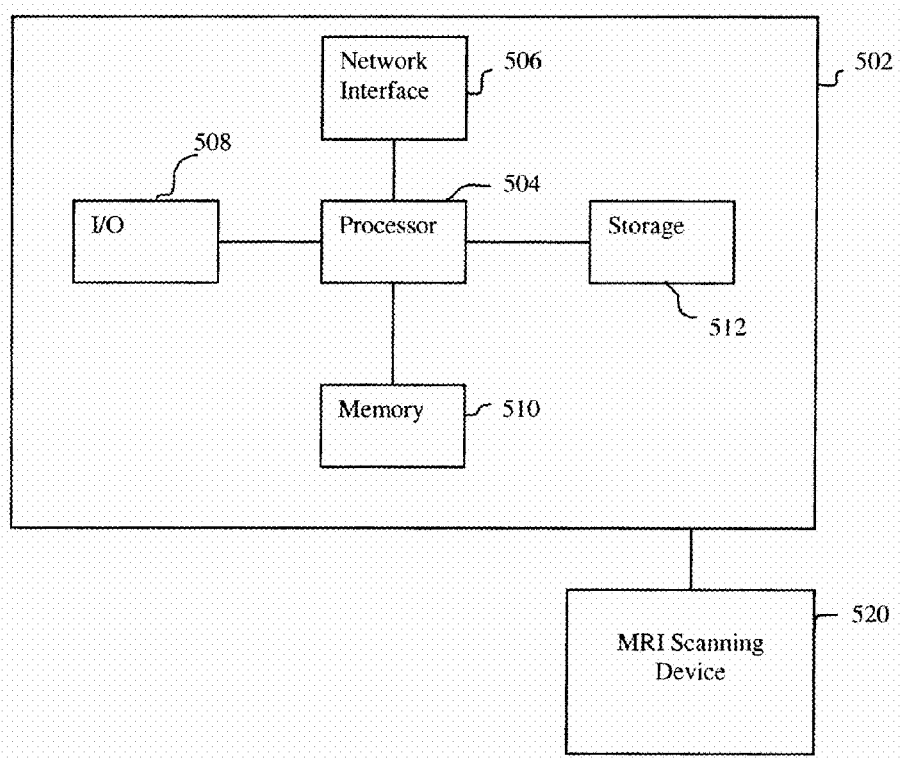
FIG. 5 is a high level block diagram of a computer capable of implementing the present invention.

The above-described methods for retrospective image combination for free-breathing cardiac MR imaging may be implemented on a computer using well-known computer processors, memory units, storage devices, computer software, and other components. A high level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.) and loaded into memory 510 when execution of the computer program instructions is desired. Thus, the steps of the method of FIG. 1 may be defined by the computer program instructions stored in the memory 510 and/or storage 512 and controlled by the processor 504 executing the computer program instructions. An MR scanning device 520 can be connected to the computer 502 to input MRI images to the computer 502. It is possible to implement the MR scanning device 520 and the computer 502 as one device. It is also possible that the MR scanning device 520 and the computer 502 communicate wirelessly through a network. The computer 502 also includes one or more network interfaces 506 for communicating with other devices via a network. The computer 502 also includes other input/output devices 508 that enable user interaction with the computer 502 (e.g., display, keyboard, mouse, speakers, buttons, etc.). One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for retrospective image combination for free-breathing magnetic resonance (MR) images, comprising:
   receiving an MR image acquisition comprising a plurality of frames, each frame comprising a plurality of pixels;
   selecting a key frame of the plurality of frames;
   generating a deformation field for each of the plurality of frames to register each of the plurality of frames with the key frame;
   determining a weight for each pixel in each of the plurality of frames based on the deformation field for each frame; and
   generating a combination image as a weighted average of the plurality of frames using the weight determined for each pixel in each frame, wherein the step of determining a weight for each pixel in each of the plurality of frames based on the deformation field for each frame comprises:
   determining the weight for each pixel in each frame to combine the frames under a minimum total deformation constraint.

2. The method of claim 1, wherein the MR image acquisition is one of a free-breathing cine cardiac MR acquisition, a free-breathing fat-water separation MR acquisition, and a free-breathing delayed enhancement MR acquisition.

3. The method of claim 1, wherein the step of selecting a key frame of the plurality of frames comprises:
   calculating a mean squared error between each frame and every other frame in the plurality of frames; and
   selecting a frame having the minimal mean squared error between the frame and every other frame in the plurality of frames as the key frame.

4. The method of claim 1, wherein the step of generating a deformation field for each of the plurality of frames to register each of the plurality of frames with the key frame comprises:
   registering each of the plurality of frames to the key frame using a non-rigid motion correction algorithm to correct cardiac motion across the frames.

5. The method of claim 1, wherein the deformation field for each frame is a map of a deformation determined for each pixel in that frame to register that frame to the key frame.

6. The method of claim 1, wherein the step of determining a weight for each pixel in each of the plurality of frames based on the deformation field for each frame comprises:
   determining a set of weights for all of the pixels in all of the frames that minimizes an energy function having a first term that penalizes large deformations, a second term that enforces smoothness on changes in the weights between neighboring pixels, and a third term that penalizes sets of weights that are not close to uniform averaging.

7. The method of claim 6, wherein the step of determining a set of weights for all of the pixels in all of the frames that minimizes an energy function comprises:
   minimizing the energy function using a variational solution in which the weights treated as functions of an evolution parameter that is varied to determine an optimal solution to minimize the energy function.

8. The method of claim 6, wherein the step of determining a set of weights for all of the pixels in all of the frames that minimizes an energy function comprises:
minimizing the energy function:

$$f(w, \overrightarrow{\text{deform}}) \stackrel{def}{=}$$

$$f\left(w(x, y, t), \overrightarrow{\text{deform}(x, y, t)}\right) = \int\int\int_\Omega \left[w^2(x, y, t) \cdot |\overrightarrow{\text{deform}(x, y, t)}| + \mu \cdot |\nabla w(x, y, t)|^2 + \beta \cdot \left(w(x, y, t) - \frac{1}{N}\right)^2\right] dx\, dy\, dt$$

where, $\overrightarrow{\text{deform}(x,y,t)}$ is the deformation field.

9. The method of claim 8, wherein the step of minimizing the energy function comprises:
minimizing the energy function using a variational solution by solving the Euler equation:

$$\mu \cdot \nabla^2 w(x, y, t) - \left(|\overrightarrow{\text{deform}(x, y, t)}| + \beta\right) \cdot w(x, y, t) + \frac{\beta}{N} = 0.$$

10. The method of claim 9, wherein the step of minimizing the energy function using a variational solution comprises:
treating the weights as a function of an evolution parameter k and solving:

$$\frac{\partial w}{\partial k} = \mu \cdot \nabla^2 w_k(x, y, t) - \left(|\overrightarrow{\text{deform}(x, y, t)}| + \beta\right) \cdot w_k(x, y, t) + \frac{\beta}{N}.$$

11. The method of claim 1, wherein a pixel value of each pixel in the combination image is a weighted average of a corresponding pixel in each of the plurality of frames using the weight determined for each pixel in each of the plurality of frames.

12. An apparatus for retrospective image combination for free-breathing magnetic resonance (MR) images, comprising:
means for receiving an MR image acquisition comprising a plurality of frames, each frame comprising a plurality of pixels;
means for selecting a key frame of the plurality of frames;
means for generating a deformation field for each of the plurality of frames to register each of the plurality of frames with the key frame;
means for determining a weight for each pixel in each of the plurality of frames based on the deformation field for each frame; and
means for generating a combination image as a weighted average of the plurality of frames using the weight determined for each pixel in each frame, wherein the means for determining a weight for each pixel in each of the plurality of frames based on the deformation field for each frame comprises:
means for determining the weight for each pixel in each frame to combine the frames under a minimum total deformation constraint.

13. The apparatus of claim 12, wherein the MR image acquisition is one of a free-breathing cine cardiac MR acquisition, a free-breathing fat-water separation MR acquisition, and a free-breathing delayed enhancement MR acquisition.

14. The apparatus of claim 12, wherein the means for selecting a key frame of the plurality of frames comprises:
means for calculating a mean squared error between each frame and every other frame in the plurality of frames; and
means for selecting a frame having the minimal mean squared error between the frame and every other frame in the plurality of frames as the key frame.

15. The apparatus of claim 12, wherein the means for generating a deformation field for each of the plurality of frames to register each of the plurality of frames with the key frame comprises:
means for registering each of the plurality of frames to the key frame using a non-rigid motion correction algorithm to correct cardiac motion across the frames.

16. The apparatus of claim 12, wherein the deformation field for each frame is a map of a deformation determined for each pixel in that frame to register that frame to the key frame.

17. The apparatus of claim 12, wherein the means for determining a weight for each pixel in each of the plurality of frames based on the deformation field for each frame comprises:
means for determining a set of weights for all of the pixels in all of the frames that minimizes an energy function having a first term that penalizes large deformations, a second term that enforces smoothness on changes in the weights between neighboring pixels, and a third term that penalizes sets of weights that are not close to uniform averaging.

18. The apparatus of claim 17, wherein the means for determining a set of weights for all of the pixels in all of the frames that minimizes an energy function comprises:
means for minimizing the energy function using a variational solution in which the weights treated as functions of an evolution parameter that is varied to determine an optimal solution to minimize the energy function.

19. The apparatus of claim 12, wherein a pixel value of each pixel in the combination image is a weighted average of a corresponding pixel in each of the plurality of frames using the weight determined for each pixel in each of the plurality of frames.

20. A non-transitory computer readable medium encoded with computer executable instructions for retrospective image combination for free-breathing magnetic resonance (MR) images, the computer executable instructions defining steps comprising:
receiving an MR image acquisition comprising a plurality of frames, each frame comprising a plurality of pixels;
selecting a key frame of the plurality of frames;
generating a deformation field for each of the plurality of frames to register each of the plurality of frames with the key frame;
determining a weight for each pixel in each of the plurality of frames based on the deformation field for each frame; and
generating a combination image as a weighted average of the plurality of frames using the weight determined for each pixel in each frame, wherein the computer executable instructions defining the step of determining a weight for each pixel in each of the plurality of frames based on the deformation field for each frame comprise computer executable instructions defining the steps of:
determining the weight for each pixel in each frame to combine the frames under a minimum total deformation constraint.

21. The non-transitory computer readable medium of claim 20, wherein the MR image acquisition is one of a free-breathing cine cardiac MR acquisition, a free-breathing fat-water separation MR acquisition, and a free-breathing delayed enhancement MR acquisition.

22. The non-transitory computer readable medium of claim 20, wherein the computer executable instructions defining the step of selecting a key frame of the plurality of frames comprise computer executable instructions defining the steps of:
    calculating a mean squared error between each frame and every other frame in the plurality of frames; and
    selecting a frame having the minimal mean squared error between the frame and every other frame in the plurality of frames as the key frame.

23. The non-transitory computer readable medium of claim 20, wherein the computer executable instructions defining the step of generating a deformation field for each of the plurality of frames to register each of the plurality of frames with the key frame comprise computer executable instructions defining the step of:
    registering each of the plurality of frames to the key frame using a non-rigid motion correction algorithm to correct cardiac motion across the frames.

24. The non-transitory computer readable medium of claim 20, wherein the deformation field for each frame is a map of a deformation determined for each pixel in that frame to register that frame to the key frame.

25. The non-transitory computer readable medium of claim 20, wherein the computer executable instructions defining the step of determining a weight for each pixel in each of the plurality of frames based on the deformation field for each frame comprise computer executable instructions defining the step of:
    determining a set of weights for all of the pixels in all of the frames that minimizes an energy function having a first term that penalizes large deformations, a second term that enforces smoothness on changes in the weights between neighboring pixels, and a third term that penalizes sets of weights that are not close to uniform averaging.

26. The non-transitory computer readable medium of claim 25, wherein the computer executable instructions defining the step of determining a set of weights for all of the pixels in all of the frames that minimizes an energy function comprise computer executable instructions defining the step of:
    minimizing the energy function using a variational solution in which the weights treated as functions of an evolution parameter that is varied to determine an optimal solution to minimize the energy function.

27. The non-transitory computer readable medium of claim 20, wherein a pixel value of each pixel in the combination image is a weighted average of a corresponding pixel in each of the plurality of frames using the weight determined for each pixel in each of the plurality of frames.

* * * * *